United States Patent
Drevö et al.

(10) Patent No.: US 11,032,695 B2
(45) Date of Patent: Jun. 8, 2021

(54) METHODS AND ARRANGEMENTS FOR TRANSFERRING MANAGEMENT OF WIRELESS DEVICES BETWEEN CORE NETWORK NODES OF A WIRELESS COMMUNICATION NETWORK

(71) Applicant: Telefonaktiebolaget LM Ericsson (publ), Stockholm (SE)

(72) Inventors: Markus Drevö, Linköping (SE); Paul Schliwa-Bertling, Ljungsbro (SE); Alexander Vesely, Feldbach (AT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/487,536

(22) PCT Filed: Feb. 15, 2018

(86) PCT No.: PCT/SE2018/050147
§ 371 (c)(1),
(2) Date: Aug. 21, 2019

(87) PCT Pub. No.: WO2018/174771
PCT Pub. Date: Sep. 27, 2018

(65) Prior Publication Data
US 2020/0059777 A1    Feb. 20, 2020

Related U.S. Application Data
(60) Provisional application No. 62/473,571, filed on Mar. 20, 2017.

(51) Int. Cl.
*H04W 8/14* (2009.01)
*H04W 8/18* (2009.01)
(Continued)

(52) U.S. Cl.
CPC .......... *H04W 8/14* (2013.01); *H04W 92/045* (2013.01); *H04W 92/24* (2013.01)

(58) Field of Classification Search
CPC ..... H04W 8/14; H04W 92/045; H04W 92/24; H04W 48/18; H04W 88/14; H04W 8/26;
(Continued)

(56) References Cited

U.S. PATENT DOCUMENTS 9,344,938 B1   5/2016  Singh et al.
10,419,983 B2 * 9/2019  Zhu ................. H04W 36/023
(Continued)

FOREIGN PATENT DOCUMENTS

EP    2668796 A1    12/2013
WO   2011062539 A1   5/2011
(Continued)

OTHER PUBLICATIONS

Communication regarding Supplementary European Search Report for European Patent Application No. 18771014.0 dated Dec. 5, 2019.
(Continued)

*Primary Examiner* — Khawar Iqbal
(74) *Attorney, Agent, or Firm* — Sage Patent Group

(57) ABSTRACT

Methods and apparatus are provided for transferring management of one or more wireless devices from being managed by a first core network node, to instead be managed by a second core network node. The method comprises obtaining information identifying the one or more wireless devices, wherein the information comprises a first group identifier identifying a first group associated with the one or more wireless devices; and transferring context data from the first core network node to the second core network node,
(Continued)

wherein the context data relates to the one or more wireless devices for use in managing the one or more wireless devices.

16 Claims, 6 Drawing Sheets

(51) Int. Cl.
*H04W 92/24* (2009.01)
*H04W 92/04* (2009.01)

(58) Field of Classification Search
CPC ......... H04W 8/00; H04W 8/18; H04W 36/10; H04W 36/12; H04W 36/125; H04W 36/14
See application file for complete search history.

(56) References Cited

U.S. PATENT DOCUMENTS

| | | | |
|---|---|---|---|
| 2014/0022996 A1* | 1/2014 | Punz | H04W 36/12 370/328 |
| 2016/0095036 A1 | 3/2016 | Stojanovski et al. | |
| 2017/0195926 A1* | 7/2017 | Iwai | H04W 36/12 |
| 2017/0251357 A1* | 8/2017 | Iwai | H04W 40/02 |
| 2018/0092154 A1* | 3/2018 | Ai | H04W 76/12 |
| 2019/0098546 A1* | 3/2019 | Cha | H04W 36/32 |
| 2019/0182873 A1* | 6/2019 | Wass | H04W 76/10 |
| 2019/0306696 A1* | 10/2019 | Yang | H04L 5/003 |
| 2019/0357295 A1* | 11/2019 | Kim | H04L 5/0053 |
| 2020/0162855 A1* | 5/2020 | Li | H04W 4/06 |
| 2020/0162888 A1* | 5/2020 | Zong | H04W 8/08 |
| 2020/0178167 A1* | 6/2020 | Jia | H04W 8/08 |
| 2020/0236534 A1* | 7/2020 | Wang | H04W 8/02 |
| 2020/0322777 A1* | 10/2020 | Ryu | H04W 12/06 |
| 2020/0344592 A1* | 10/2020 | Yang | H04L 5/02 |

FOREIGN PATENT DOCUMENTS

| | | |
|---|---|---|
| WO | 2011062542 A1 | 5/2011 |
| WO | 2012136812 A1 | 10/2012 |
| WO | 2016035230 A1 | 3/2016 |
| WO | 2016111565 A1 | 7/2016 |

OTHER PUBLICATIONS

3GPP TR 23.707, V13.0.0, "3rd Generation Partnership Project; Technical Specification Group Services and System Aspects; Architecture Enhancements for Dedicated Core Networks; Stage 2 (Release 13)," Technical Report, Dec. 2014, 39 pages.
International Search Report and Written Opinion of the International Searching Authority for International Application No. PCT/SE2018/050147 dated Jun. 8, 2018.
3GPP TS 23.003 V15.2.0, "3rd Generation Partnership Project; Technical Specification Group Core Network and Terminals; Numbering, addressing and identification (Release 15)," Technical Specification, Dec. 2017, 116 pages.
3GPP TS 23.401 V15.2.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Technical Specification, Dec. 2017, 404 pages.
3GPP TS 36.412 V14.0.0, "3rd Generation Partnership Project; Technical Specification Group Radio Access Network; Evolved Universal Terrestrial Radio Access Network (E-UTRAN); S1 signalling transport (Release 14)," Technical Specification, Mar. 2017, 8 pages.
3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP) (Release 15)," Technical Specification, Dec. 2017, 367 pages.
3GPP TS 23.401 V14.4.0, "3rd Generation Partnership Project; Technical Specification Group Services and System Aspects; General Packet Radio Service (GPRS) enhancements for Evolved Universal Terrestrial Radio Access Network (E-UTRAN) access (Release 14)," Technical Specification, Jun. 2017, 386 pages.

* cited by examiner

METHODS AND ARRANGEMENTS FOR TRANSFERRING MANAGEMENT OF WIRELESS DEVICES BETWEEN CORE NETWORK NODES OF A WIRELESS COMMUNICATION NETWORK

CROSS REFERENCE TO RELATED APPLICATIONS

This application is a 35 U.S.C. § 371 national stage application of PCT International Application No. PCT/SE2018/050147, filed on Feb. 15, 2018, which itself claims priority to U.S. Provisional Application No. 62/473,571 filed Mar. 20, 2017, the disclosure and content of both of which are incorporated herein by reference in their entireties.

TECHNICAL FIELD

Embodiments herein relate to methods and arrangements for transferring management of wireless devices between core network nodes of a wireless communication network, e.g. telecommunication network.

BACKGROUND

Communication devices such as wireless communication devices, that simply may be named wireless devices, may also be known as e.g. User Equipments (UEs), mobile terminals, wireless terminals and/or Mobile Stations (MS). A wireless device is enabled to communicate wirelessly in a wireless communication network, e.g. a cellular communications network, which may also be referred to as a wireless communication system, or radio communication system, sometimes also referred to as a cellular radio system, cellular network or cellular communication system. A wireless communication network may sometimes simply be referred to as a network and abbreviated NW. The communication may be performed e.g. between two wireless devices, between a wireless device and a regular telephone and/or between a wireless device and a server via a Radio Access Network (RAN) and possibly one or more Core Networks (CN), comprised within the wireless communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type Communication (MTC) devices, i.e. a device that is not necessarily associated with a conventional user, such as a human, directly using the device. MTC devices may be as defined by the 3rd Generation Partnership Project (3GPP).

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network covers a geographical area which conventionally is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby e.g. also on cell size. A cell is typically identified by one or more cell identities. The base station at a base station site provides radio coverage associated with one or more cells and/or beams. Beams are further discussed below. A cell and beam may thus be associated with geographical areas, respectively, where radio coverage for the cell and beam, respectively, is provided by a base station at a base station site. Cells and/or beams may overlap so that several cells and/or beams cover the same geographical area. By a base station providing or serving a cell and/or beam is meant that the base station provides radio coverage such that one or more wireless devices located in the geographical area where the radio coverage is provided may be served by the base station in said cell and/or beam. When a wireless device is said to be served in or by a cell and/or beam this implies that the wireless device is served by the base station providing radio coverage for the cell and/or beam. One base station may serve one or several cells and/or beams. Further, each base station may support one or several communication technologies. The base stations communicate over the air interface operating on radio frequencies with the wireless device within range of the base stations.

The expression downlink, which may be abbreviated DL, is used for the transmission path from the wireless communication network, e.g. a base station thereof, to the wireless device. The expression uplink, which may be abbreviated UL, is used for the transmission path in the opposite direction i.e. from the wireless device to the wireless communication network, e.g. base station thereof.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3GPP Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices.

General Packet Radio Service (GPRS) is a packet oriented mobile data service on the 2G cellular communication system's global system for mobile communications (GSM).

Enhanced Data rates for GSM Evolution (EDGE) also known as Enhanced GPRS (EGPRS), or IMT Single Carrier (IMT-SC), or Enhanced Data rates for Global Evolution is a digital mobile phone technology that allows improved data transmission rates as a backward-compatible extension of GSM.

High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G). A design principle under consideration for 5G wireless communication networks is to base it on an ultra-lean design. This implies that "always on signals", such as reference signals in LTE, shall be avoided in the network as much as possible. Expected benefits from this design principle include e.g. significantly lower network energy consumption, better scalability, higher degree of forward compatibility, lower interference from system overhead signals and consequently higher throughput in low load scenario, and also improved support for wireless device, or so called user, centric beamforming.

Advanced Antenna Systems (AAS) is an area where technology has advanced significantly in recent years and where we also foresee a rapid technology development in the years to come. Advanced antenna systems in general and massive Multiple Input Multiple Output (MIMO) transmission and reception will likely be used in future wireless communication network and in 5G wireless communication networks.

A beam, such as mentioned above, is traditionally associated with transmission using so called beamforming, typically by means of a phase-adjustable, or phased, antenna array, the same underlying technique is equally applicable to reception. Beamforming, or spatial filtering, may be described as a signal processing technique for directional signal transmission and/or reception. This is typically achieved by combining elements in the phased antenna array, often referred to simply as a phased array, in such a way that signals at particular angles experience constructive interference while others experience destructive interference. Beamforming can be used at both the transmitting and receiving ends in order to achieve spatial selectivity. Thereby, thanks to directivity, improvements are possible to achieve compared with omnidirectional reception/transmission. For example, a transmitter may perform transmit beamforming by transmitting the same signal on all elements of a phased array, except for a per-element weight comprising a phase shift and an amplitude factor. Similarly, a receiver with an phased array, that may be the same and/or configured in the same way as of the transmitter, may perform receive beamforming by applying per-element weights and adding the resulting signals before further processing. The selectivity and directivity may thus be the same in transmission and reception. For transmission, it means that the signal will be stronger in some direction or directions and weaker in others. For reception, it means that signals from some direction or directions are amplified and those from other directions are attenuated, relative to each other. The same antenna may be used, i.e. operated, for transmission and reception although typically not at the same time.

Beams and beamforming may be applied in the uplink and/or downlink, and at both communication ends or only at one communication end. For example, in the downlink regarding communication between a wireless communication network and a communication device, the wireless communication network may uses transmit beamforming and/or the communication device may use receive beamforming. Correspondingly, in the uplink regarding communication between a wireless communication network and a communication device, the wireless communication network may uses receive beamforming and/or the communication device may use transmit beamforming. Synonymous naming for transmit beamforming may be transmission beamforming or transmitting beamforming and synonymous naming for receive beamforming may be reception beamforming or receiving beamforming. Conventionally when referring to a beam, a transmit beam is meant, i.e. a radio beam formed and/or generated by transmit beamforming. However, as can be realized from above, it can as well make sense to refer to receive beams, i.e. beams associated with receive beamforming. Herein, "beam" typically refers to a transmit beam if nothing else is indicated, as should be recognized by the skilled person.

A beam provided by a network node is typically for communication with, e.g. for serving, one or a few (compared to a conventional cell) communication devices at the same time, and may be specifically set up for communication with these. The beam may be changed dynamically by beamforming to provide desirable coverage for the one or few communication devices communicating using, e.g. being served by, the beam. A beam provided by a communication device is typically for communication with the wireless communication network, particularly one or a few radio network nodes thereof, typically one, or at least one, that is a main target for the beam.

A Radio Access Network Core Network (RAN-CN) interface terminates in the Radio Access Network (RAN) at a logical node (in e.g. Evolved Packet System (EPS), the Evolved Universal Terrestrial Radio Access Network (E-UTRAN) logical node is an eNB, in 5G, or NR, system the 5G RAN logical node is called gNB in the context of this invention) and in the CN, in EPS, the Control Plane of the RAN-CN interface is terminated at the Mobility Management Entity (MME) and in 5G CN in the Authentication and Mobility Function (AMF), while the User plane of the RAN-CN interface is terminated, in EPS, at the S-GW (Serving Gateway) and in 5G CN in the User Plane Function (UPF). In 5G, User Plane related contexts, e.g. so called PDU Sessions, are controlled by the Session Management Function (SMF), in EPS, session management is performed in the MME. A control plane interface also exists in EPS between an MME and its associated S-GWs, as well in the 5G System between an AMF and its associated SMFs, and between SMFs and UPFs.

In EPS, the Control Plane of the RAN-CN interface, known as the S1-MME interface, is setup by the eNB by means of the so called S1AP S1 Setup procedure. A prerequisite for the S1 Setup procedure to take place is the provision of configuration data at the eNB to establish an Stream Control Transmission Protocol (SCTP) association towards an MME. Once the SCTP association has been established (see e.g. 3GPP 36.412) the eNB and the MME may exchange application level data needed for the eNB and the MME to correctly interoperate on the S1 interface (see e.g. 3GPP TS 36.413). For example, the eNB may provide its identification, Tracking Area(s) (TA) and PLMN(s) broadcast on Uu and the default paging DRX. The MME may provide its served Public Land Mobile Network(s) (PLMN), its MME Group Identification and the served MME codes (MMEC). 3GPP TS 23.003 specifies that for EPS the MMEC may be an 8 bit identifier, the MME Group Identification may be an 16 bit identification and the PLMN Identity may comprise an MCC (mobile country code) of 3 digits and an MNC (mobile network code) of 3 or 4 digits. The PLMN Id together with the MME Group Identification and the MME Code may form the GUMMEI, the Globally Unique MME Identifier. The eNB identification may be a 20 bit identifier for regular eNBs and a 28 bit identifier for Home eNBs. For 5G it is expected that similar identification for the AMF and the 5G RAN logical node will be specified. Parameters exchanged during the S1 Setup procedure may be later on updated by both the eNB and the MME.

The temporary UE identification, with which the UE is identified once it has registered at an MME, may be the System Architecture Evolution (SAE) Temporary Mobile Subscriber Identity (S-TMSI). The S-TMSI may comprise a UE identification (M-TMSI, a 32 bit identifier) and a CN node identification (the MME Code). The S-TMSI allocated by the MME to uniquely identify a UE within an MME pool may be used as the reference for a UE Context in the CN node (MME in the EPS, AMF (or a similar name) in the 5G System). The S-TMSI may be used to page the UE. The MMEC part of the S-TMSI may be used to identify the MME within the MME-pool at the eNB at connection setup, if the S-TMSI was allocated by one of the MMEs in the MME-pool. If the UE enters a pool for the first time and a UE context exists in another MME-pool, the S-TMSI and a Global MME identification (GUMMEI) may be provided in order to allow the new serving MME to retrieve the UE context from the previous MME.

UE's registering for the first time may be distributed among the MMEs within a pool along weight-factors, taking into account the MMEs relative capacity provided at the S1 Setup or Update procedures. By that, equally loaded MMEs may be ensured.

In EPS, the MME, like in the 5G system the AMF, may be the CN side termination point of the RAN-CN control plane interface. In EPS, a UE may be identified on the RAN-CN control plane (S1-MME) interface by an MME S1AP UE ID, which is allocated by the MME that holds the UE context and which is unique within that MME. On the RAN side, the peer termination point of the RAN-CN control plane interface may be a logical RAN node. In EPS, it may be the eNB, which allocates an eNB S1AP UE ID, an identity which is unique in that eNB. I.e., a UE-associated logical signaling connection is denoted by a MME S1AP UE ID/eNB S1AP UE ID pair.

Moving UE contexts to another CN node for load (re-) balancing reasons or to remove a CN node completely so far has always required interaction with the UE, see e.g. 3GPP TS 23.401 § 4.3.7.3.

3GPP 23.401 in § 4.3.7.3 describes a method where a UE that is registered on an MME (within an MME Pool Area) is moved to another MME by initiating the S1 Release procedure with release cause "load balancing TAU required". The S1 and RRC connections are released and the UE initiates a TAU but provides neither the S-TMSI nor the GUMMEI to eNodeB in the RRC establishment. The eNB may then select an MME based on the weight-factors provided. If e.g. there is a requirement that a MME should be completely off-loaded, such an MME may provide its own weight-factor set to zero to the eNB, thereby avoiding any UE to be registered anew at that MME.

SUMMARY

It is an object to alleviate or at least reduce one or more problems indicated herein.

Hence, the object may be to provide one or more improvements with regard to transferring management of wireless devices between core network nodes, such as between MMEs or AMFs, i.e. from one core network node to another, e.g. involving transferring of contexts, including context data, for these wireless devices.

Embodiments are exemplified in relation to e.g. FIGS. 1, 2 and 4, 5.

Note that actions below and in the figures may be taken in any suitable order and/or be carried out fully or partly overlapping in time when this is possible and suitable. Dotted lines attempt to illustrate features that are not present in all embodiments.

Also note that actions below may when suitable fully or partly involve and/or be initiated and/or be triggered by another, e.g. external, entity or entities, such as device and/or system, than what may be indicated in figures to carry out the actions. Such initiation may e.g. be triggered by said another entity in response to a request from e.g. the device and/or the wireless communication network, and/or in response to some event resulting from program code executing in said another entity or entities. Said another entity or entities may correspond to or be comprised in a so called computer cloud, or simply cloud, and/or communication with said another entity or entities may be accomplished by means of one or more cloud services.

Embodiments herein e.g. comprise:

A first method, e.g. performed by a wireless communication network, e.g. the wireless communication network 100, and/or by network node(s) configured to operate in and/or configured to serve the wireless communication network. Network node(s) configured to serve the wireless communication network may e.g. correspond to or be comprised in the computer cloud 202. The method may be for transferring management of one or more wireless devices, e.g. the wireless device 120*a* or the first group of wireless devices 120*a-b,* from being managed by a first core network node, e.g. the first core network node 130, to instead be managed by another, second core network node, e.g. the second core network node 131. The core network nodes may be of a specific type that is the same, e.g. MMEs or AMFs. The first method may be performed by the first core network node 131.

The first method comprises one or more of the following actions that may be taken in any suitable order and/or be carried out fully or partly overlapping in time when this is possible and suitable.

Initiating to set up or setting up 201 at least one first interface between the second core network node and one or more relevant radio network nodes, respectively, for allowing the second core network node to communicate with these radio network nodes and thereby enable the second core network node to manage the one or more wireless devices subject to the transfer. The one or more radio network node are typically the same radio network node(s) involved when the one or more wireless devices are managed by the first core network node and may thus be radio network nodes that the first core network node has a communication interface with. The one or more relevant network nodes may comprise radio network node(s) that serve(s), and/or last served, and/or is expected to serve the wireless device(s) subject for the transfer. The one or more relevant network nodes may thus e.g. include also neighbouring radio network node(s) to the radio network node(s) involved when the one or more wireless devices are managed by the first core network node.

The node 400 and/or the processing module 401 and/or the processing circuit 404 and/or the I/O module 405 and/or the initiating module 406 and/or the setting up module 407 may be operative, or configured, to perform this action.

The one or more relevant radio network nodes typically also participate in setting up said interfaces, respectively, with the second core network node, as indicated by action 202. Action 202 is typically made in response to action 201 and/or e.g. in response to that the second core network node, or e.g. a management node, requests to set up the interface.

These action(s) may not be part of all embodiments.

Initiating to set up or setting up 203 a second interface between the first core network node and the second core network node for transferring of context data from the first core network node to the second core network node. In some embodiments the transfer is performed over a second interface that is specific for transfer of context data between core network nodes, or more particularly between core network nodes of a certain type, such as MMEs. Context data is further discussed below.

The node 400 and/or the processing module 401 and/or the processing circuit 404 and/or the I/O module 405 and/or the initiating module 406 and/or the setting up module 407 may be operative, or configured, to perform this action.

This action may not be part of all embodiments.

Obtaining 205 information identifying one or more wireless devices that are managed by the first core network node and for which management shall be transferred to the second core network node. In other words, said identified one or more wireless devices are such that shall be managed by second core network node instead of by the first core network node. The second network node may be core network node that is already managing other wireless devices, or may be a core network node that is not yet managing any wireless devices, e.g. a core network node that has newly been set up and/or configured to manage wireless devices.

The information, e.g. being or comprising at least one first group identifier identifying a first group associated with the one or more wireless device, may be obtained, e.g. generated, internally of a node executing the action or be obtained by being received from an external node, e.g. management node (not shown) that manages and/or controls both the first and second core network nodes. The information may generated in response to a certain event that triggers to, or a decision to, transfer the management of said wireless device (s).

In some embodiments the one or more wireless devices are a single wireless device, e.g. the wireless device 120, in other embodiments a group of wireless devices, e.g. the wireless devices 120a-b, and/or in some embodiments all wireless devices that are managed by the first core network node, e.g. the wireless device 120c.

The wireless devices may be grouped, such as divided into in several groups and the identification and/or transfer may be performed per group, i.e. on a group basis. Each core network node, e.g. the first and second core network nodes, may mange more than one group at the same time. However, typically each group identifier is only to be managed by one core network node at the same time.

The wireless devices of each group may be grouped based on a group identifier. Each wireless device may be associated, e.g. mapped, to a certain such group identifier. The group identifier may be a code that is associated with the first core network node, or in general with a core network node of of a certain type that may be the type of the first and second core network nodes, i.e. MME or AMF. The group identifier may be a MME Code (MMEC), which may be preferred in the case of LTE. The wireless devices may be associated with, e.g. map to, the group identifier by an wireless device identifier, i.e. an identifier identifying the wireless device, e.g. TMSI. In some embodiments, the first core network node may thus manage groups of one or more wireless devices in each group, each group identified by a group identifier, e.g. a MMEC. Each wireless devise of a group may thus be associated with one and the same group identifier, e.g. MMEC. The association may be made by mapping an identifier of the wireless devices, e.g. TMSI, to the MMEC, where different ranges of wireless device identifiers, e.g. TMSIs, may be mapped to different MMECs, respectively. In other words, each of the one or more wireless devices is associated a wireless device identifier, and wherein each of the wireless device identifiers associated with the one or more wireless devices is associated with the group identifier.

For example, the first core network node may manage wireless devices 120a-b that may belong to a first group identified by a first group identifier, e.g. a first MMEC and wireless device 120c that may belong to a second group identified by a second group identifier, e.g. a second MMEC. Also, for example, the second core network node may manage wireless devices 120d-e that may belong to a third group identified by a third group identifier, e.g. a third MMEC. The transfer of management may then performed so management of the first group is to be transferred from the first core network node to the second core network node. In other words, the first core network node is further managing a second group of wireless devices identified by a second group identifier.

The node 400 and/or the processing module 401 and/or the processing circuit 404 and/or the I/O module 405 and/or the obtaining module 408 may be operative, or configured, to perform this action.

Initiating to receive and/or receiving 207, or in other words transferring, from the first core network node to the second core network node, context data relating to said one or more wireless devices being managed by the first core network node. The transfer should use the interface set up in action 203 above.

As used herein, context data relating to a wireless device being managed by a core network node, e.g. MME, refers to data associated with this wireless device and that relates to the management, e.g. information that is stored by and/or used by and/or is needed, by this core network node to perform the management, e.g. to provide required management functionality. The type of management and/or required management functionality may be predetermined, e.g. specified by a standard, for the type of core network node that the core network node belongs to, e.g. for a MME or AMF.

Note that not all context data for a wireless device in the first core network node need to be subject to the transfer to the second core network node since it may be sufficient to only transfer context data that is relevant to transfer and meaningful for the second core network node when managing the wireless device.

During the transfer, any managing action of the first core network node, e.g. of a MME or AMF, concerning a wireless device subject to the transfer may be postponed until after the transfer so that it can instead be performed by the second core network node. Additionally or alternatively, during and/or after the transfer, any managing action of the first core network node concerning a wireless device subject to the transfer, may be routed by the first core network node to the second core network node.

An option, e.g. if it is not possible or desirable for some reason and/or in some situation to postpone and/or reroute a management action so it can be performed by the second core network node during or after the transfer, may be to perform the management action during the transfer and using the context data of the first core network node. The transfer of context data may then be delayed to the end of the transfer and/or be re-transferred as a last action of the transfer and/or at least after the managing action has finished. This way any change of context data for this wireless device will anyway be transferred to the second core network node. It is also possible, although it may be undesirable from an implementation point of view, to delay or retransfer only such part of the context data that may and/or will change, or has changed, by the management action. In case it is known in advance that a certain management action will or will not cause change of context data for a wireless device, it is possible with a combination of the above, e.g. to let management actions that does not cause any change relevant for the transfer to proceed during the transfer and for other management actions use context data of the first core network node and delay transfer of context data only if it will or risk to be changed by the management action. In this case, some management actions may thus be allowed to be performed and some not during the transfer, some may be delayed and/or retransferred etc. It may be predetermined how different type of management actions shall be dealt with in this regard during the transfer.

The node 400 and/or the processing module 401 and/or the processing circuit 404 and/or the I/O module 405 and/or the initiating module 406 and/or the receiving module 409 may be operative, or configured, to perform this action.

Actions 201, 203, 205 and/or 207 may be performed in response to, i.e. be triggered by, an external or internal event and/or signal. The event and/or signal may directly or indirectly be generated by and/or origin from some resource utilization and/or load monitoring, or watch, functionality that determines when it is needed to transfer management and/or for which wireless devices, e.g. when it is suitable to scale in or out as discussed elsewhere herein.

Obtaining 208 an indication that the context data transfer, such as in action 207, has finished, e.g. that all contexts of said one or more wireless devices have been transferred to said second core network node, e.g. been validly and/or correctly transferred. The indication may partly be based on that the first core network node signals this to the second core network node and/or that the second core network node confirms that a complete and/or valid transfer has been received. In other words, the indication may comprise a confirmation received from the second core network node.

The node 400 and/or the processing module 401 and/or the processing circuit 404 and/or the I/O module 405 and/or the obtaining module 408 may be operative, or configured, to perform this action.

This action may not be part of all embodiments.

Initiating to send or sending 210, in response to the obtained indication in action 208, information to one or more relevant radio network nodes and/or further core network nodes associated with said one or more wireless devices, information about the management transfer, i.e. information that informs these nodes about that the wireless device(s) are now instead managed by the second core network instead of the first core network node. The one or more relevant radio network nodes may be as discussed above for action 201 and 202. The one or more relevant radio network node may then communicate, such as in action 212, accordingly with the second core network node instead of the first core network node concerning these wireless device(s) using e.g. the interface set up in action 201.

The node 400 and/or the processing module 401 and/or the processing circuit 404 and/or the I/O module 405 and/or the initiating module 406 and/or the sending module 410 may be operative, or configured, to perform this action.

This action may not be part of all embodiments.

A second method, e.g. performed by a wireless communication network, e.g. the wireless communication network 100, and/or by network node(s) configured to operate in and/or configured to serve the wireless communication network. Network node(s) configured to serve the wireless communication network may e.g. correspond to or be comprised in the computer cloud 202. The method may be for transferring management of one or more wireless devices, e.g. the wireless device 120a or the first group of wireless devices 120a-b, from being managed by a first core network node, e.g. the first core network node 130, to instead be managed by another, second core network node, e.g. the second core network node 131. The core network nodes should be of a specific type that is the same, e.g. MMEs or AMFs. The second method may be performed by the second core network node 130.

The second method comprises one or more of the following actions that may be taken in any suitable order and/or be carried out fully or partly overlapping in time when this is possible and suitable.

Initiating to set up or setting up 204 an interface for transferring of context data from the first core network node to the second core network node. In some embodiments the transfer is performed over an interface that is specific for transfer of context data between core network nodes, or more particularly between core network nodes of a certain type, such as MMEs.

The node 500 and/or the processing module 501 and/or the processing circuit 504 and/or the I/O module 505 and/or the initiating module 506 and/or the setting up module 507 may be operative, or configured, to perform this action.

This action may not be part of all embodiments.

Obtaining 206 information identifying said one or more wireless devices that are managed by the first core network node and for which management shall be transferred to the second core network node. This action may correspond to action 205 discussed above but may here relate to the second core network node and/or be carried out by the second core network node, instead of the first core network node.

The node 500 and/or the processing module 501 and/or the processing circuit 504 and/or the I/O module 505 and/or the obtaining module 508 may be operative, or configured, to perform this action.

Initiating to send and/or sending 207, or in other words transferring, from the first core network node to the second core network node, context data relating to said one or more wireless devices being managed by the first core network node. The transfer should use the interface set up in action 204 above. This action has already been discussed above but from the perspective of the first core network node instead of the second network node.

The node 500 and/or the processing module 501 and/or the processing circuit 504 and/or the I/O module 505 and/or the initiating module 506 and/or the sending module 509 may be operative, or configured, to perform this action.

Actions 204, 206 and/or 207 may be performed in response to, i.e. be triggered by, an external or internal event and/or signal. The event and/or signal may directly or indirectly be generated by and/or origin from some resource utilization and/or load monitoring, or watch, functionality that determines when it is needed to transfer management and/or for which wireless devices, e.g. when it is suitable to scale in or out as discussed elsewhere herein.

Obtaining 209 an indication that the context data transfer, such as in action 207, has finished, e.g. that all contexts of said one or more wireless devices have been transferred to said second core network node, e.g. been validly and/or correctly transferred. The indication may partly be based on that the first core network node signals this to the second core network node and/or that the second core network node confirms that a complete and/or valid transfer has been received. This action may correspond to action 208 discussed above but may here relate to the second core network node and/or be carried out by the second core network node, instead of the first core network node.

The node 500 and/or the processing module 501 and/or the processing circuit 504 and/or the I/O module 505 and/or the obtaining module 508 may be operative, or configured, to perform this action.

This action may not be part of all embodiments.

Initiating to send or sending 211, in response to the obtained indication in action 209, information to one or more relevant radio network nodes and/or further core network nodes associated with said one or more wireless devices, information about the management transfer, i.e. information that informs these nodes about that the wireless device(s) are now instead managed by the second core network instead of the first core network node. The one or more relevant radio network nodes may be as discussed above for action 201 and 202. The one or more relevant radio network node may then communicate, such as in action 212, accordingly with the second core network node instead of the first core network node concerning these wireless device(s) using e.g. the interface set up in action 201. This action may correspond to action 210 discussed above but may here relate to the second core network node and/or be carried out by the second core network node, instead of the first core network node.

The node 500 and/or the processing module 501 and/or the processing circuit 504 and/or the I/O module 505 and/or the initiating module 506 and/or the sending module 509 may be operative, or configured, to perform this action.

This action may not be part of all embodiments.

An advantage with embodiments herein is that the transfer can be performed without involvement of, such as without the need of performing any actions by, the wireless devices that are subject for the transfer. Further advantages involve that signaling and behavior between involved radio network nodes serving the wireless devices and the core networks node can be relatively unaffected. It is more or less a question of establishing a communication interface to the second core network node and when the data contexts(s) of the wireless devices(s) has been transferred, change communication interface regarding these wireless devices so that communication is made to the second core network node.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
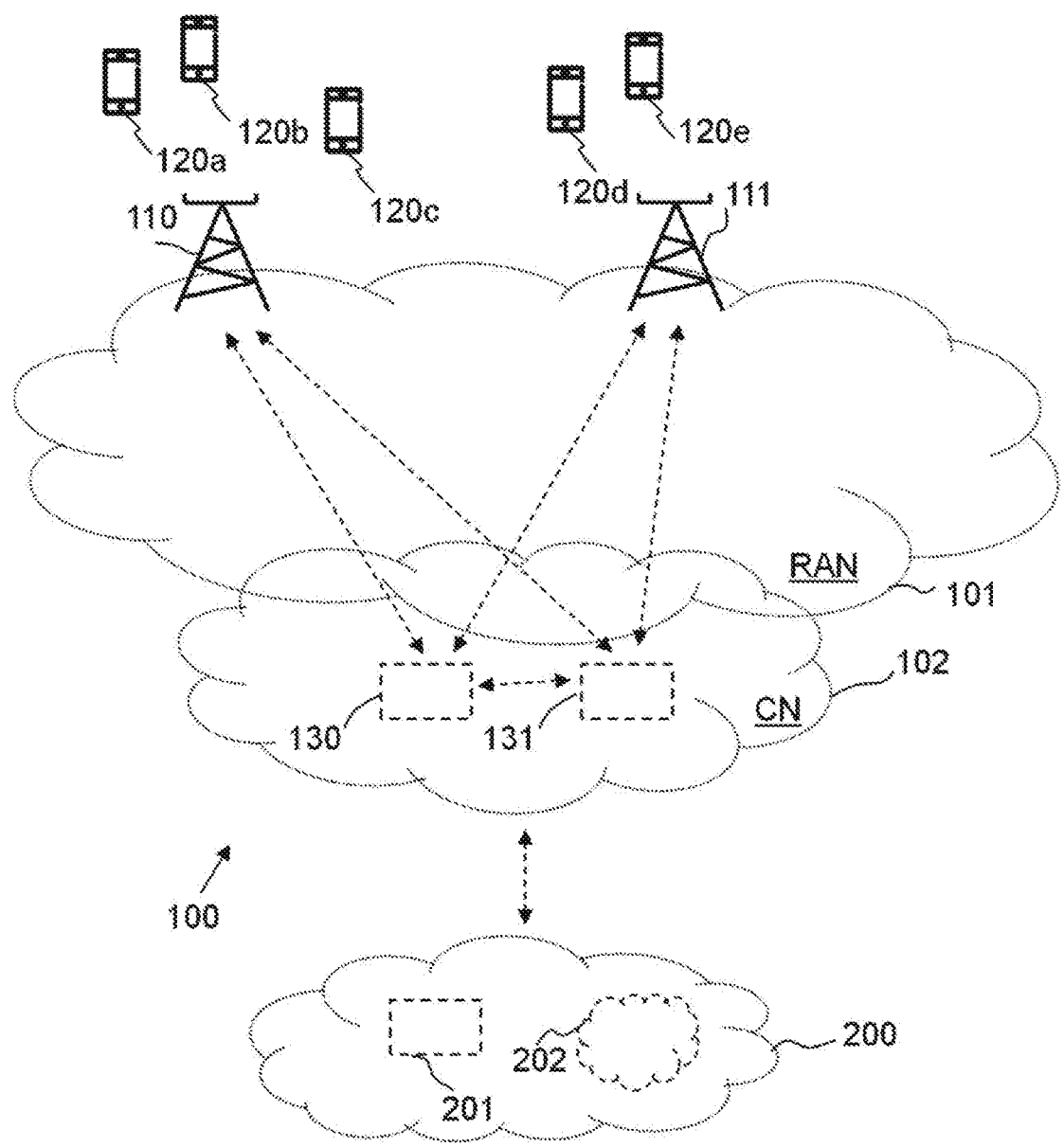
FIGS. 1-6 are shown.

Throughout the following description similar reference numerals may be used to denote similar elements, units, modules, circuits, nodes, parts, items or features, when applicable. In the Figures, features that appear only in some embodiments are typically indicated by dashed lines.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of a development towards embodiments herein, the problems indicated in the Background will first further be discussed.

Based on the information in the Background, it in previous solution the transfer of management of a UE from a first CN node, e.g. a first MME, to a second CN node, e.g. a second MME, required the UE to perform a Tracking Area Update procedure mimicking a new entry into the MME pool and being distributed to the second MME in the pool based on the weight factors indicated to the eNB by the second MME(s).

A UE would need to be brought into ECM-CONNECTED and the eNB would need to ask to release the connection or the UE would need to be paged.

Overall requirements for the Next Generation (NG) architecture (see TR 23.799, Study on Architecture for Next Generation) and the NG Access Technology (see TR 38.913, Study on Scenarios and Requirements for Next Generation Access Technologies) will impact the design of 5G (see RP-160671, New SID Proposal: Study on New Radio Access Technology, DoCoMo) from mobility to control plane design and mechanisms.

It may be important to design an overall system that enables scaling in and out CN nodes, especially the CN nodes that terminates the RAN-CN interface. This holds true for the 5G system, but can also be considered for the 4G System (EPS)

Moving UE contexts efficiently and quickly from a first CN node to a second CN node, without any interaction with the UE is not possible up to now, neither for the EPS nor for the 5G System.

With the introduction of an inactive mode in the 5G system and light connected mode in the EPS it may happen that a UE being regarded as ECM-CONNECTED is actually inactive from a radio perspective for quite a while and not reachable to perform TAU (or any similar update procedure). Also UEs in ECM-IDLE may not be reachable for a while (using features like eDRX or PSM (power saving mode)). Therefore it is not possible to offload contexts of inactive UEs to another CN node quickly.

Embodiments herein may be considered to relate to actions and methods to enable moving UE context from one CN node (MME in EPS, AMF in 5G system) to another without UE involvement in an efficient manner. Advantages involve reducing or minimizing the offload time and independence of the UE connectivity state on NAS and AS level.

Embodiments herein fully or partly relate to and/or are based on the following principles, realizations, understandings etc.:

1. Relocating a UE context from a first CN node, e.g. a first MME/AMF, to a second CN node, e.g. a second MME/AMF, without re-allocating a UE NAS Identification (S-TMSI in EPS) and in some examples, minimizing the signaling between the RAN and the CN and within the CN, may require to assign UE specific identifiers (e.g. S-TMSI on NAS, MME S1AP UE ID on S1-MME) in a way that groups of UEs can be formed that enables efficient en-bloc transfer of UE contexts from one the first CN node to the second CN node. For example, in some example, transferring management of one or more UEs (wireless devices) from being managed by the first CN node to the second CN node may comprise obtaining information identifying the one or more UEs which are being transferred. This information may comprise a first group identifier associated with the one or more wireless devices. In other words, the efficient en-bloc transfer may be enabled by identifying the one or more UEs using a single group identifier.

The S-TMSI is per definition unique within a control plane CN node pool, while the MME S1AP UE ID (and its corresponding part in 5G) may need to be extended by a UE group identification (e.g. like the MMEC in EPS).

2. Efficiently scaling out a CN node (MME or AMF) may require the possibility to transfer UE Context data of a group of UEs from the first CN node to the (newly instantiated or nominated existing MME or AMF) second CN node. This may be achieved via a second interface which may be a specified inter-CN-node interface or via a vendor specific one. In some embodiments, the first CN node and second CN node may set up the second interface between the first CN node and the second CN node for transferring the context data. Efficient transfer would foresee to transfer a huge number of UE context within one signaling transaction (e.g. n*2exp10 UE contexts at once). One possible approach is to group UEs in the CN that needs to scale out into well distinguishable groups, by using a group identifier e.g. a (in EPS) MME Code identifying wireless devices that are served by that MME. In some examples, the group identifier comprises a code that is associated with the first core network node; or the group identifier comprises a code associated with a core network node of a same type as the first core network node. In order to group the UEs it may be good to have the option to move them between core network nodes, e.g. MMEs. GUTI reallocation including change of group identification in the MME S1AP UE ID. Grouping UEs caters for a likely use case, where UE contexts of a 3rd party provider are moved. E.g., if an MME serves 4 MME Codes, scaling out may be achieved by e.g. equally distributing UEs over the 4 MME Codes and at a certain point in time transfer UEs which S-TMSI's are prefixed by 2 out of the serving 4 MME Codes to another CN node. It may therefore be appreciated that the first CN node may be serving one or more groups of wireless devices each identified by a different group identifier, e.g. MMEC. It may be also possible to achieve a finer granularity by extending the currently in EPS used 8 bits or the MME Code and use some bits from the M-TMSI. By that, the S-TMSI range for a single MME Code could be split into several parts.

In some embodiments therefore each of the one or more wireless devices is associated a wireless device identifier, and each of the wireless device identifiers is associated with the one or more wireless devices is associated with the group identifier.

3. Efficiently scaling in of CN nodes may make it possible to completely remove a CN node by transferring all UE Contexts to one or several CN nodes, i.e., in EPS terms, to reduce the number of MMEs within an MME pool. After successful scaling in, the pool may still serve the same number of MME Codes. The same approach could be followed as for scaling out (described above).

4. Scaling in and out of CN nodes (MMEs and AMFs) may be especially advantageous for UEs for which a UE-associated signaling connection is held on the RAN-CN control plane interface but are not expected to be active for some time. For scaling out, a new logical CN node (MME or AMF) may be instantiated, including new instances of RAN-CN and CN internal interfaces.

5. Re-locating the responsibility of CN nodes for groups of UEs may require the ability of handling UE contexts also during the transfer of UE context data:

a. The handling of UEs by the new node is taken over once the UE context is successfully transferred. Until the complete group of UEs is transferred, handling of the UE context is re-routed to the new node by the old node. In other words, during transfer of the wireless devices to another core network node any managing action of the first core network node concerning one of the one or more wireless devices may be postponed until after the transfer. Alternatively, any managing action of the first core network node concerning one of the one or more wireless devices is routed by the first core network node to the second core network node.

The following is an example of actions that may be performed fully or in part by the CN nods: 1) Start copy contexts 2) While copying monitor if any context impacted 3) Copying of UE contexts ends 3) Route signaling to copied UE contexts to be processed in new node. When signaling with UE ends from original node copy the remaining UE context and replace any old copy of that context in the new node.

b. UE contexts may not be transferred if a transaction is ongoing. If a transaction starts once the context was started to be transferred, the transaction is delayed and then re-routed once the transfer was acknowledged.

c. On the RAN-CN interface, the RAN logical node may need to be prepared that a new CN node is about to serve a range of S-TMSIs (along the MMEC or similar identifier). If the RAN-CN interface instance doesn't exist yet, it may need to be setup. So, in the transition period, if not all UE contexts of a UE group is transferred, it may still route mobile originated transactions to the old CN node, and only re-route transaction signaling to the new node upon the old nodes request.

d. It may be expected that signalling transactions for UEs newly entering the CN node pool area will not result in allocating such UEs to a UE group which UE contexts are about to be transferred. Indication like in point c) may help the RAN node to address the proper CN node.

e. The fact that the CN-side allocated identification of the UE-associated signaling connection (MME UE S1AP ID in EPS, in 5G its correspondence) is extended by the UE group identification (e.g. the MMEC in EPS, AMFC in 5G) enables the transfer of UE contexts between CN nodes without involvement of the RAN logical node.

f. Once all UE contexts of a UE group have been transferred, the RAN logical node may be informed that the UE group identification (E.g. the MMEC in EPS, respective id in 5G, e.g. "AMFC") is now fully served by the new CN node and no longer by the old node. The same kind of indication may need to be provided from the MME to the S-GW in EPS or from the AMF to the SMF in 5G. In some embodiments, the first core network node may obtain an indication that the context data of the UE group has been validly and/or correctly transferred to the second core network node. This indication may be received from the second core network node. In response to obtaining the indication, the first core network node may transmit information to one or more relevant radio network nodes and/or further core network nodes associated with said one or more wireless devices, wherein the information comprises information about the management transfer.

g. In the same way as signalling relations between the RAN and the CN node may be made UE group specific, also UE signalling connections between the CN node terminating the RAN-CN control plane interface and the CN node terminating RAN-CN user plane interface may be extended by a UE group identification, in order to avoid unnecessary involvement of CN nodes.

h. Also, relations at connection is UE group specific enables For UE contexts, for which a UE-associated signaling connection exists. If a transfer of UE context occurs during a UE transaction, the UE context may be re-routed to the new node once the UE context has been successfully transferred. Such a transfer may enable both nodes to exchange the transfer status to be mutually informed about which CN node is actually the node that "holds" the UE Context. While UE Contexts are transferred to another CN node and the other CN hasn't taken control of a UE Context, e.g. is not yet confirmed to be successfully transferred, another CN node may be responsible to where the UE context currently resides.

Figure 3:
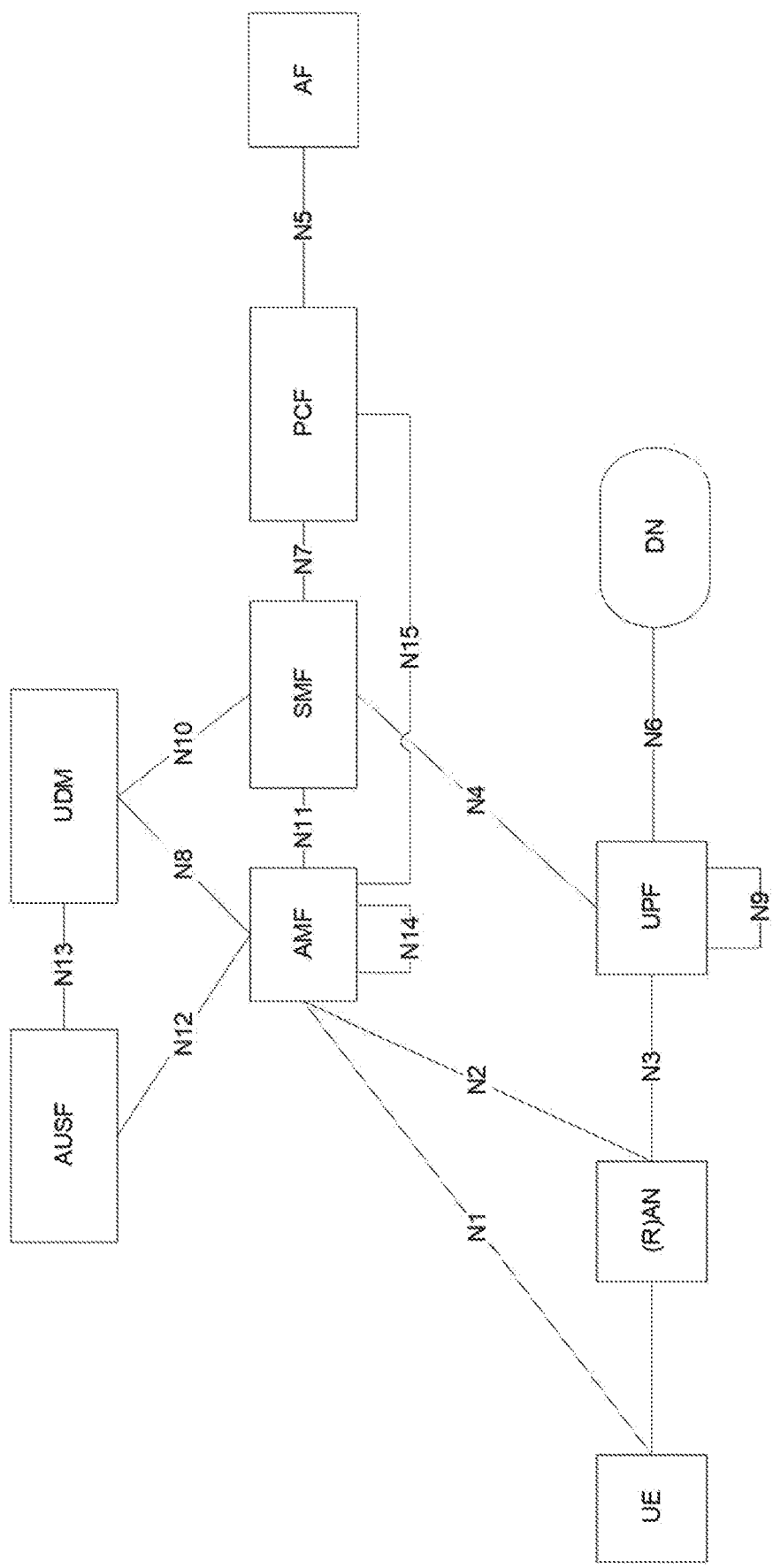

FIG. 3 schematically illustrates an example of a non-roaming 5G System Architecture in reference point representation. As described above, a corresponding change on the interfaces between the AMF and SMF and other network functions may required as in e.g. LTE when such interfaces are associated with the UE Context in the AMF.

It shall be noted that using the MMEC is one example of the invention. The generalized description may be considered based on a routing provided by the Core Network (AMF, MME) to the RAN and possibly other Network Functions (SMF) that may be used to map signaling associated with a specific UE/subscriber to a specific interface.

Embodiments herein may thus be used to efficiently transfer UE contexts from one control plane CN node to another without UE involvement, and may be especially useful for inactive UEs, and with low or even minimum signalling on the RAN-CN control plane interface and on CN internal interfaces.

FIG. 1 is a schematic block diagram schematically depicting an example of a wireless communication network 100 that is relevant for embodiments herein and in which embodiments herein may be implemented. The wireless communication network 100 may comprise a Radio Access Network (RAN) 101 part and a core network (CN) 102 part. The wireless communication network 100 is typically a telecommunication network or system, such as a cellular communication network that supports at least one Radio Access Technology (RAT), e.g. LTE and/or New Radio (NR) that also may be referred to as 5G.

The wireless communication network 100 comprises network nodes that are communicatively interconnected. The network nodes may be logical and/or physical and are located in one or more physical devices. The wireless communication network 100 comprises one or more network nodes, e.g. a first radio network node 110, and/or a second radio network node 111 may be comprised in the RAN 101. that are examples of radio network nodes. A radio network node typically comprises a radio transmitting network node, such as base station, and/or that is or comprises a controlling node that control one or more radio transmitting network nodes. The first and second radio network nodes may be eNBs in case of LTE or gNBs in case of NR.

The wireless communication network 100, or specifically one or more network nodes thereof, e.g. the first radio network node 110 and/or the second radio network node 111, may be configured to serve and/or control and/or manage and/or communicate with one or more communication devices, such as wireless devices 120a-e, in one or more cells (not shown) and/or using one or more beams (not shown) provided by the wireless communication network 100, e.g. the first radio network node 110 and/or the second radio network node 111. For example, wireless devices 120a-c may be served by the first radio network node 110 and the wireless devices 120d-e may be served by the second radio network node 111.

Moreover, the wireless communication network 100, such as the CN 102, may comprise one or more core network nodes of one or more different types, e.g. a first core network node 130 and a second core network node 131. The first and second core network nodes may be of the same type, e.g. be MMEs in case of LTE or AMFs in case of NR. Each core network node may support and/or provide communication interface to other core network nodes and radio network nodes.

The first core network node 120 may be associated with, such as support, the first and second radio network nodes and at a certain point in time manage all or at least some wireless devices associated with, e.g. served by these radio network nodes. The wireless devices may be grouped by certain group identifiers, e.g. MMECs, that they map to, and the wireless devices managed by each core network node may be determined by the group identifiers.

Moreover, the wireless communication network, e.g. the CN 102 and core network nodes thereof, may further be communicatively connected to, and thereby e.g. provide access for said wireless devices, to an external network 200, e.g. the Internet. A wireless device may thus communicate via the wireless communication network 100, with the external network 200, or rather with one or more other devices, e.g. servers and/or other communication devices connected to other wireless communication networks, and that are connected with access to the external network 200.

Moreover, there may be one or more external nodes, e.g. an external node 201, for communication with the wireless communication network 100 and node(s) thereof. The external node 201 may e.g. be an external management node. Such external node may be comprised in the external network 200 or may be separate from this.

Furthermore, the one or more external nodes may correspond to or be comprised in a so called computer, or computing, cloud, that also may be referred to as a cloud system of servers or computers, or simply be named a cloud, such as a computer cloud 202 as shown in the figure, for providing certain service(s) to outside the cloud via a communication interface. The exact configuration of nodes etc. comprised in the cloud in order to provide said service (s) may not be known outside the cloud. The name "cloud" is often explained as a metaphor relating to that the actual device(s) or network element(s) providing the services are typically invisible for a user of the provided service(s), such as if obscured by a cloud. The computer cloud 202, or typically rather one or more nodes thereof, may be communicatively connected to the wireless communication network 100, or certain nodes thereof, and may be providing one or more services that e.g. may provide, or facilitate, certain functions or functionality of the wireless communication network 100 and may e.g. be involved in performing one or more actions according to embodiments herein. The computer cloud 202 may be comprised in the external network 200 or may be separate from this. For example, the first and/or second core network nodes may be connected to, e.g. via one or more other core network nodes of other type(s), to the external network and/or e.g. the computer cloud 202 that may serve the first and second core network nodes with functionality and/or, at least to some extent, even control the first and second core network nodes. There is typically also one or more managing nodes that are communicatively connected and can be used to control and/or manage several other nodes, e.g. core network nodes, such as both the first and second core network nodes. Such node may be a separate node part of the wireless communication network and/or may be fully or partly implemented by means of the computer cloud.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as further and other type of core network nodes, e.g. base stations, radio network nodes, beams, and/or cells etc., as realized by the skilled person, but which are not shown herein for the sake of simplifying.

Figure 2:
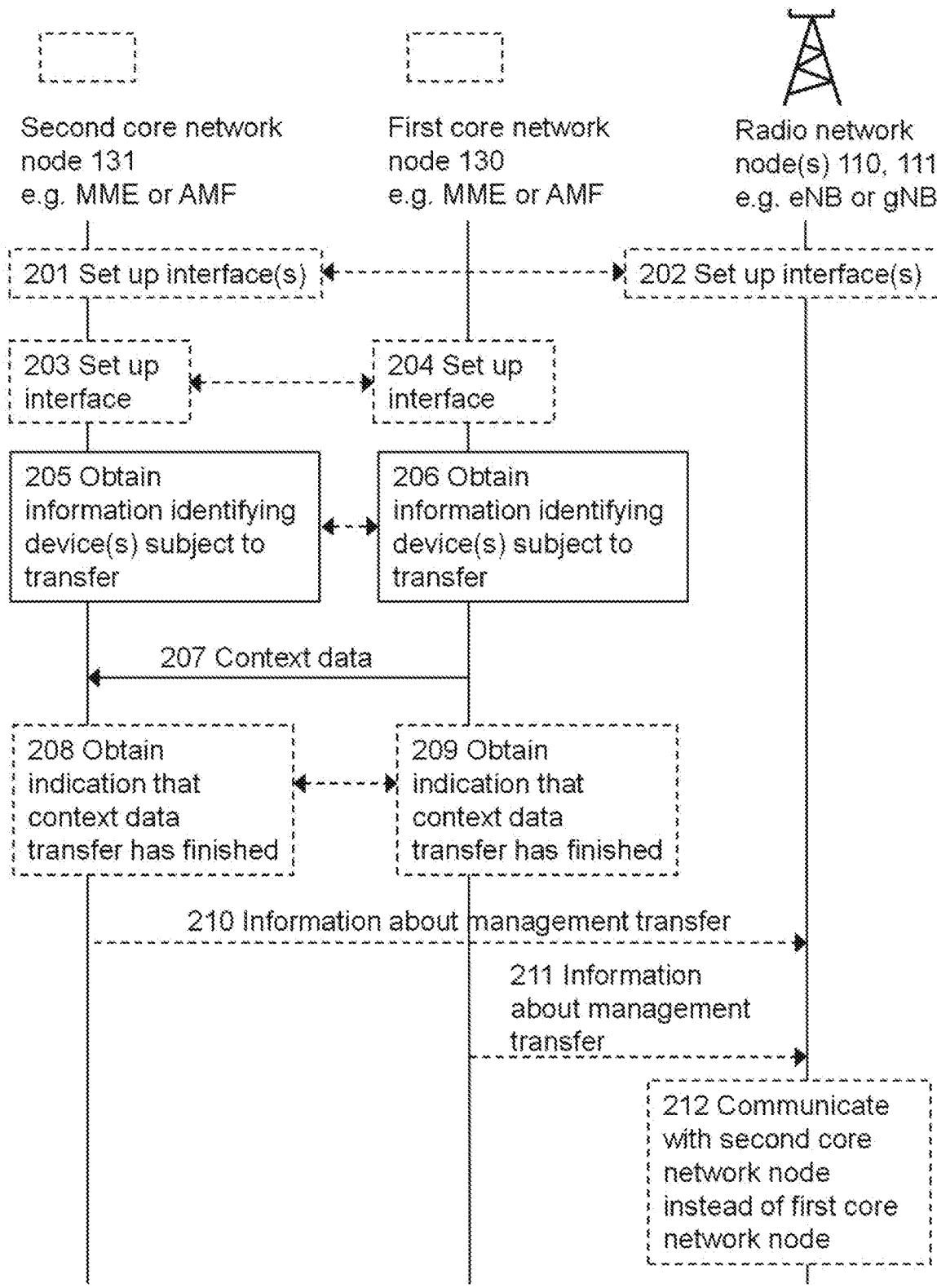

FIG. 2 is a combined signaling diagram and flowchart for schematically illustrating some embodiments herein.

Figure 4:
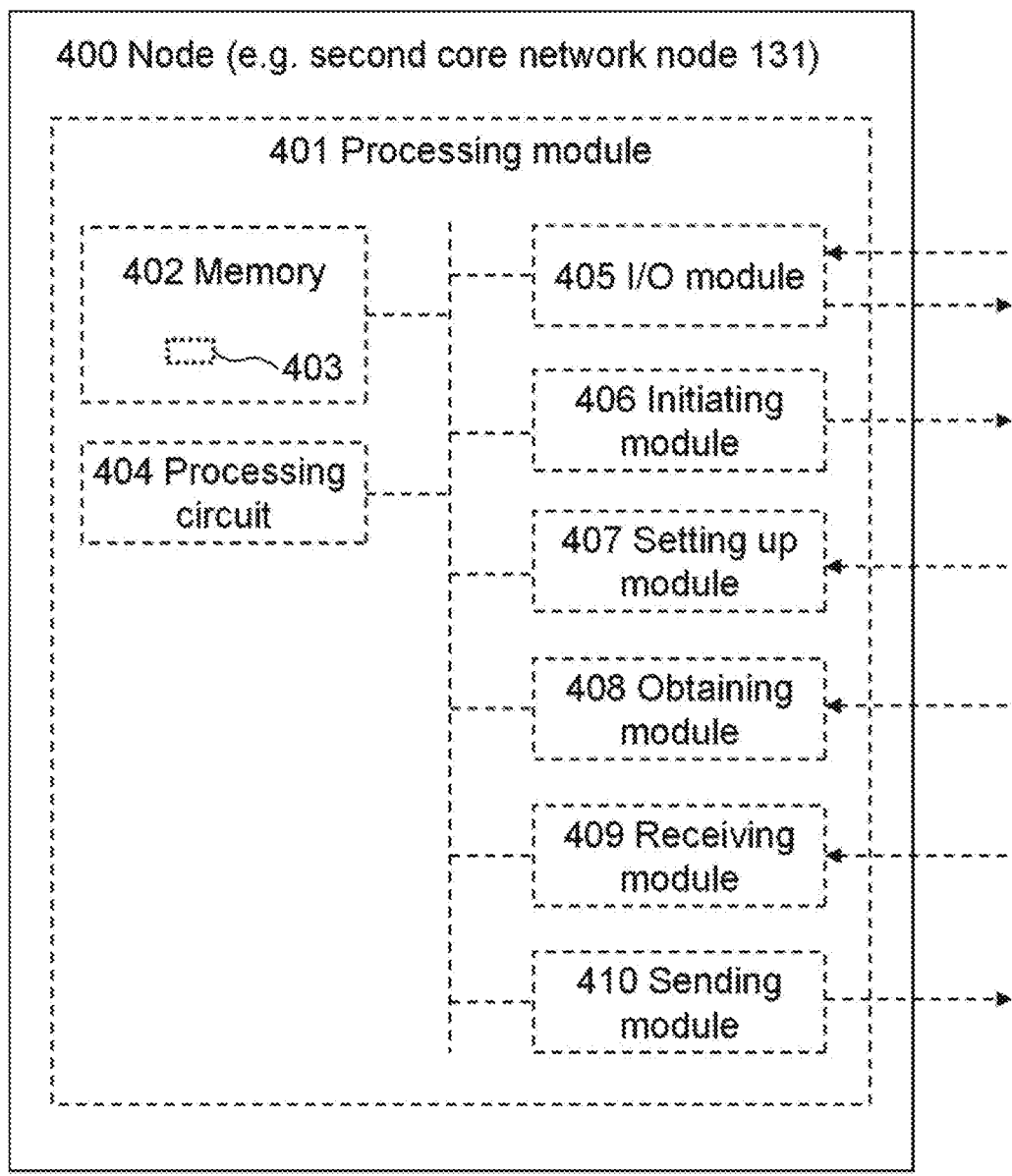
Figure 5:
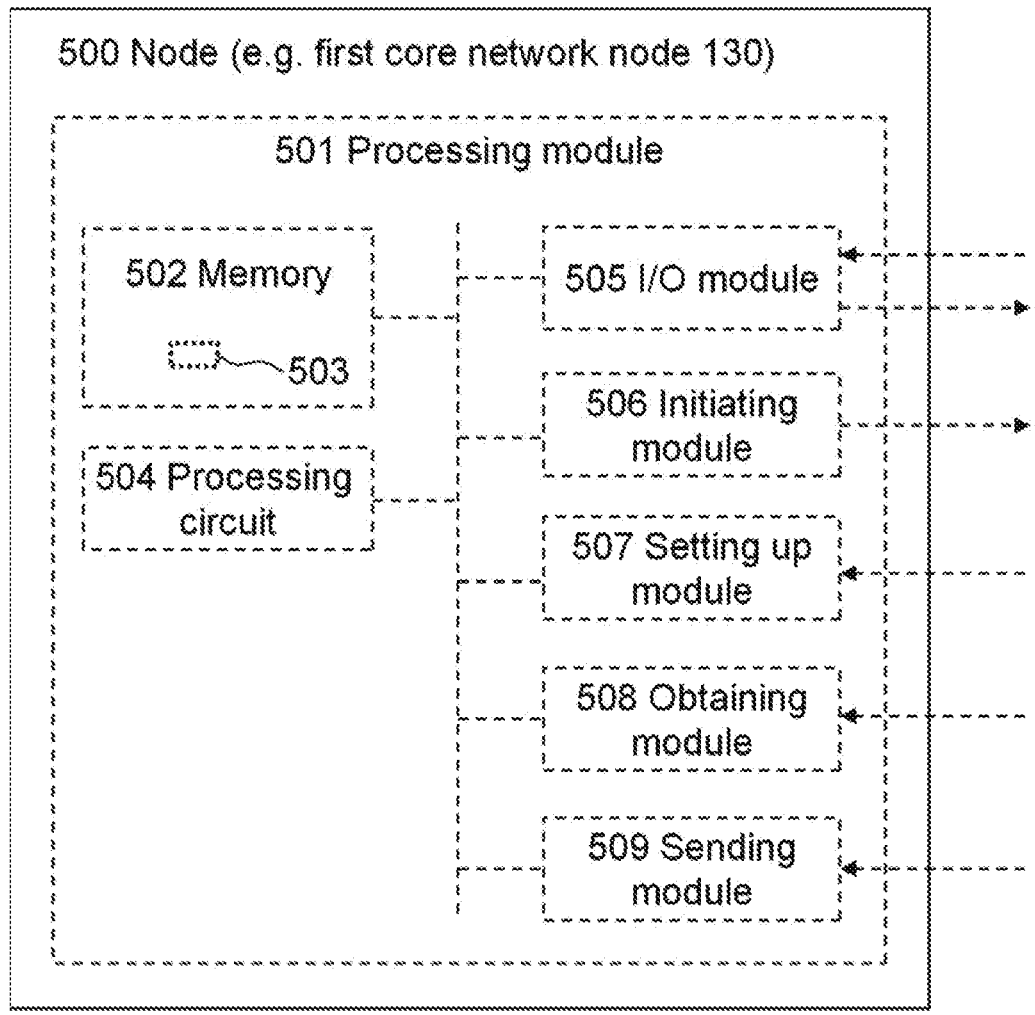

FIGS. 4 and 5 are schematic block diagrams for illustrating embodiments of a first node 400, that e.g. may be the first core network node 130 and a second node 500 that e.g. may be the second core network node 131, and how these respectively may be configured to perform the methods and/or one or more actions described herein e.g. relating to respective node, e.g. for being performed by, respective node. Hence, the first node 400 and the second node 500, respectively, may comprise:

A processing module 401, 501, such as a means, one or more hardware modules, including e.g. one or more processors, and/or one or more software modules for performing said methods and/or actions.

A memory 402, 502, which may comprise, such as contain or store, a computer program 403, 503. The computer program comprises 'instructions' or 'code' directly or indirectly executable by the respective node so that it performs the said methods and/or actions. The memory may comprise one or more memory units and may be further be arranged to store data, such as configurations and/or applications involved in or for performing functions and actions of embodiments herein.

A processing circuit 404, 504, as an exemplifying hardware module and may comprise or correspond to one or more processors. In some embodiments, the processing module may comprise, e.g. 'is embodied in the form of' or 'realized by' the processing circuit. In these embodiments, the memory may comprise the computer program executable by the processing circuit, whereby the node comprising it is operative, or configured, to perform said method and/or actions.

An Input/Output (I/O) module 405, 505, configured to be involved in, e.g. by performing, any communication to and/or from other units and/or nodes, such as sending and/or receiving information to and/or from other external nodes or devices. The I/O module may be exemplified by an obtaining, e.g. receiving, module and/or a sending module, when applicable.

Each node 400, 500 may also comprise other exemplifying hardware and/or software module(s) as may have been described elsewhere in the present disclosure, which module(s) may be fully or partly implemented by the respective processing circuit.

Figure 6A:
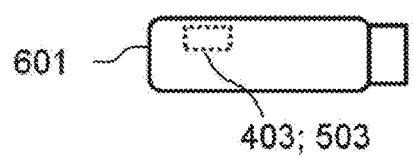
Figure 6B:
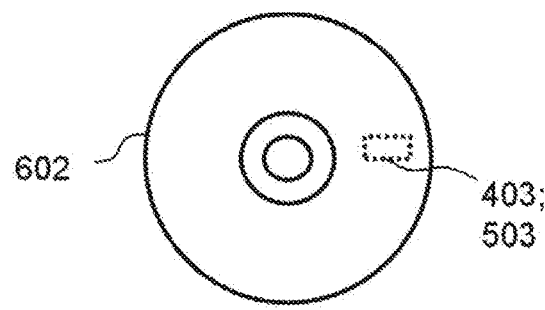
Figure 6C:
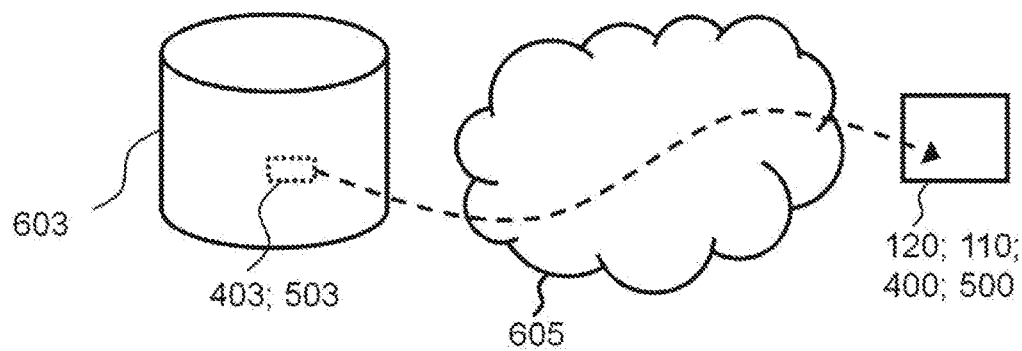

FIGS. 6a-c are schematic drawings illustrating embodiments relating to a computer program that may be any one of the computer programs 403, 503, and that comprises instructions that when executed by the respective processing circuit causes the node comprising it to perform the respective method as described above.

In some embodiments there is provided a computer program product, i.e. a data carrier, comprising a computer-readable medium and the computer program stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 601 as in FIG. 6a, a disc storage medium 602 such as a CD or DVD as in FIG. 6b, a mass storage device 603 as in FIG. 6c. The mass storage device is typically based on hard drive(s) or Solid State Drive(s) (SSD). The mass storage device may be such that is used for storing data accessible over a computer network 605, e.g. the Internet or a Local Area Network (LAN).

The computer programs, respectively, may furthermore be provided as a pure computer program or comprised in a file or files. The file or files may be stored on the computer-readable medium and e.g. available through download e.g. over the computer network, such as from the mass storage device via a server. The server may e.g. be a web or File Transfer Protocol (FTP) server. The file or files may e.g. be executable files for direct or indirect download to and execution on the a node for carrying out a method, e.g. by the processing circuit, or may be for intermediate download and compilation to make them executable before further download and execution causing the node(s) to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the first node and the second node to be configured to and/or to perform the above-described methods, respectively, and/or actions thereof.

Identification by any identifier herein may be implicit or explicit. The identification may be unique in the wireless communication network 100 or at least in a part or some area thereof.

The term "network", or simply "NW", as used herein typically, as should be realized without any information on the contrary, refer to the wireless communication network 100.

The term UE, terminal or MS, as may be used herein typically, as should be realized without any information on the contrary, refer to the wireless device 120.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc.

The term "radio network node" as used herein may as such refer to any type of network node serving a wireless device and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

The term "communication device" or "wireless device" as used herein, may as such refer to any type of device arranged to communicate, e.g. with a radio network node, in a wireless, cellular and/or mobile communication system, such as the wireless communication network 100, and may thus be a wireless communication device. Examples include: target devices, device to device UE, device for Machine Type of Communication (MTC), MTC device, machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may as such refer to any type of network node or wireless device, such as described above.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that any enumerating terminology such as first network node, second network node, first base station, second base station, or similar, that may have been used herein, as such should be considering non-limiting and the terminology as such does not imply a certain hierarchical relation. Without any explicit information in the contrary, naming by enumeration should be considered merely a way of accomplishing different names.

| Abbreviation | Explanation |
| --- | --- |
| AMF | Authentication and Mobility Function |
| CN | Core Network |
| CP | Control Plane |
| EPS | Evolved Packet System |
| gNB | 5G RAN logical node |
| GUMMEI | Globally Unique MME Identifier |
| MME | Mobility Management Entity |
| MMEC | MME Code |
| RAN | Radio Access Network |
| S-GW | Serving Gateway |
| SMF | Session Management Function |
| TMSI | Temporary Mobile Subscriber Identity |
| UDM | User Data Management |
| UPF | User Plane Function |

The invention claimed is:

1. A method, performed in a first core network node, for transferring management of a group of wireless devices from being managed by the first core network node, to instead be managed by a second core network node, the method comprising:
obtaining information indicating management of the group of wireless devices is to be transferred to the second core network node, wherein the information comprises a first group identifier identifying the group of wireless devices;
transferring context data from the first core network node to the second core network node, wherein the context data relates to the group of wireless devices for use in managing the group of wireless devices;
while transferring the context data from the first core network node to the second core network node, determining a first management action of the first core network node concerning the group of wireless devices will not alter the context data;
transferring the first management action that will not alter the context data to the second core network node while transferring the context data;
while transferring the context data from the first core network node to the second core network node, determining a second management action of the first core network node concerning the group of wireless devices will alter a part of the context data;
delaying transfer of the part of the context data responsive to determining the second management action concerning the group of wireless devices will alter a part of the context data;
responsive to delaying the transfer of the part of the context data, performing the second management action concerning the group of wireless devices; and
transferring the part of the context data responsive to performing the second management action concerning the group of wireless devices.

2. The method as claimed in claim 1 wherein the group identifier comprises a code that is associated with the first core network node; or wherein the group identifier comprises a code associated with a core network node of a same type as the first core network node.

3. The method as claimed in claim 1 wherein each wireless device of the group of wireless devices is associated a wireless device identifier, and wherein each of the wireless device identifiers associated with each wireless device of the group of wireless devices is associated with the group identifier.

4. The method as claimed in claim 1, further comprising;
initiating set up of a first interface between the second core network node and a radio network node;
wherein the radio network node is either serving, last known to be serving or expected to serve one of the group of wireless devices.

5. The method as claimed in claim 4 further comprising;
setting up a second interface between the first core network node and the second core network node for transferring the context data; and wherein transferring the context data comprises transferring the context data from the first core network node to the second core network node using the second interface.

6. The method as claimed in claim 1 further comprising: obtaining an indication that the context data has been validly and/or correctly transferred to the second core network node.

7. The method as claimed in claim 6 wherein the indication comprises a confirmation received from the second core network node.

8. The method as claimed in claim 1, further comprising:
while transferring the context data from the first core network node to the second core network node, determining that a transaction associated with a wireless device of the group of wireless devices is ongoing;
responsive to determining the transaction associated with the wireless device of the group of wireless devices is ongoing, delaying re-routing of the transaction associated with the wireless device of the group of wireless devices until the context data associated with the wireless device of the group of wireless devices is transferred; and
re-routing the transaction to the second core network node responsive to receiving an indication that the context data associated with the wireless device of the group of wireless devices has been transferred.

9. A first core network node for transferring management of one or more wireless devices from the first core network node to a second core network node, the first core network node comprising:
an interface; and
a processor, wherein the processor is configured to perform operations comprising:
obtaining information indicating management of the group of wireless devices is to be transferred to the second core network node, wherein the information comprises a first group identifier identifying the group of wireless devices;
transferring context data from the first core network node to the second core network node, wherein the context data relates to the group of wireless devices for use in managing the group of wireless devices;
while transferring the context data from the first core network node to the second core network node, determining a first management action of the first core network node concerning the group of wireless devices will not alter the context data;
transferring the first management action that will not alter the context data to the second core network node while transferring the context data;
while transferring the context data from the first core network node to the second core network node, determining a second management action of the first core network node concerning the group of wireless devices will alter a part of the context data;
delaying transfer of the part of the context data responsive to determining the second management action concerning the group of wireless devices will alter a part of the context data;
responsive to delaying the transfer of the part of the context data, performing the second management action concerning the group of wireless devices; and
transferring the part of the context data responsive to performing the second management action concerning the group of wireless devices.

10. The first core network node as claimed in claim 9 wherein the group identifier comprises a code that is associated with the first core network node; or wherein the group identifier comprises a code associated with a core network node of a same type as the first core network node.

11. The first core network node as claimed in claim 9 wherein each wireless device of the group of wireless devices is associated a wireless device identifier, and wherein each of the wireless device identifiers associated with each wireless device of the group of wireless devices is associated with the group identifier.

12. The first core network node as claimed in claim 9, wherein the processor is further configured to perform operations comprising:
initiating set up of a first interface between the second core network node and a radio network node;
wherein the first radio network node is either serving, last known to be serving or expected to serve one of the group of wireless devices.

13. The first core network node as claimed in claim 12, wherein the processor is further configured to perform operations comprising:
setting up a second interface between the first core network node and the second core network node for transferring the context data; and
wherein transferring the context data comprises transferring the context data from the first core network node to the second core network node using the second interface.

14. The first core network node as claimed in claim 9, wherein the processor is further configured to perform operations comprising:
obtaining an indication that the context data has been validly and/or correctly transferred to the second core network node.

15. The first core network node as claimed in claim 14, wherein the indication comprises a confirmation received from the second core network node.

16. The first core network node as claimed in claim 9, wherein the processor is further configured to perform operations comprising:
while transferring the context data from the first core network node to the second core network node, determining that a transaction associated with a wireless device of the group of wireless devices is ongoing;
responsive to determining the transaction associated with the wireless device of the group of wireless devices is ongoing, delaying re-routing of the transaction associated with the wireless device of the group of wireless devices until the context data associated with the wireless device of the group of wireless devices is transferred; and
re-routing the transaction to the second core network node responsive to receiving an indication that the context data associated with the wireless device of the group of wireless devices has been transferred.

* * * * *